United States Patent
Park et al.

(10) Patent No.: US 7,195,712 B2
(45) Date of Patent: Mar. 27, 2007

(54) WASTEWATER TREATMENT APPARATUS AND METHOD FOR REMOVING NITROGEN AND PHOSPHORUS

(75) Inventors: Jong Bok Park, Gyunggi-do (KR); Jae Jin Lee, Gyunggi-do (KR); Yong Dae Jeong, Gyunggi-do (KR); Gyung Hae Aoh, Gyunggi-do (KR)

(73) Assignee: Samsung Electronics Co., Ltd., Seoul (KR)

( * ) Notice: Subject to any disclaimer, the term of this patent is extended or adjusted under 35 U.S.C. 154(b) by 189 days.

(21) Appl. No.: 10/505,424

(22) PCT Filed: Jun. 5, 2002

(86) PCT No.: PCT/KR02/01073

§ 371 (c)(1),
(2), (4) Date: Aug. 24, 2004

(87) PCT Pub. No.: WO03/072512

PCT Pub. Date: Sep. 4, 2003

(65) Prior Publication Data

US 2005/0087480 A1    Apr. 28, 2005

(30) Foreign Application Priority Data

Feb. 28, 2002   (KR) .................. 10-2002-0010984

(51) Int. Cl.
  *C02F 3/30*   (2006.01)
(52) U.S. Cl. .............. 210/605; 210/623; 210/630; 210/259; 210/903; 210/906
(58) Field of Classification Search .......... 210/605, 210/621, 622, 623, 629, 630, 252, 259, 903, 210/906
See application file for complete search history.

(56) References Cited

U.S. PATENT DOCUMENTS

| | | | |
|---|---|---|---|
| 3,964,998 A | 6/1976 | Barnard | |
| 4,056,465 A | 11/1977 | Spector et al. | |
| 4,867,883 A | 9/1989 | Daigger et al. | |
| 6,054,044 A | 4/2000 | Hoffland | |
| 2001/0045391 A1* | 11/2001 | Han | 210/605 |
| 2003/0024875 A1* | 2/2003 | Wang | 210/624 |

FOREIGN PATENT DOCUMENTS

| | | | |
|---|---|---|---|
| JP | 60-54791 | * | 3/1985 |
| JP | 08-243587 | | 9/1996 |
| KR | 2001-27643 | | 4/2001 |
| KR | 2001-0087698 | | 9/2001 |
| KR | 2002-44820 | | 6/2002 |
| WO | WO 01/66475 | * | 9/2001 |

* cited by examiner

*Primary Examiner*—Fred G. Prince
(74) *Attorney, Agent, or Firm*—Buchanan Ingersoll & Rooney PC

(57) ABSTRACT

Provided is a wastewater treatment apparatus for removing nitrogen and phosphorus having an anaerobic tank, an anoxic tank, an aerobic tank and a clarifier, wherein the aerobic tank includes has a baffle installed at one side thereof to form a dissolved oxygen reducing zone for reducing the concentration of dissolved oxygen contained in internally recycled wastewater returned from a dissolved oxygen reducing zone while increasing the concentration of dissolved oxygen contained in treated effluent supplied from a part other than the dissolved oxygen reducing zone of the aerobic tank to a clarifier in a subsequent stage. Since organic matter present in wastewater is effectively used, the efficiency of removing nitrogen and phosphorus can be increased and the amounts of oxygen required throughout the treatment process and organic matter required for denitrification can be reduced. Also, synthesis of cells of microorganisms is suppressed. Therefore, the repair and maintenance costs can be reduced.

9 Claims, 6 Drawing Sheets

WASTEWATER TREATMENT APPARATUS AND METHOD FOR REMOVING NITROGEN AND PHOSPHORUS

BACKGROUND OF THE INVENTION

1. Field of the Invention

The present invention relates to a wastewater treatment apparatus and method for removing nitrogen and phosphorus, and more particularly, to a wastewater treatment apparatus and method, the wastewater treatment apparatus having an anaerobic tank, an anoxic tank, an aerobic tank and a clarifier, wherein the aerobic tank has a baffle installed at one side thereof to form a dissolved oxygen reducing zone for reducing the concentration of dissolved oxygen contained in internally recycled wastewater returned from a dissolved oxygen reducing zone while increasing the concentration of dissolved oxygen contained in treated effluent supplied from a part other than the dissolved oxygen reducing zone of the aerobic tank to a clarifier in a subsequent stage.

2. Description of the Related Art

Nitrogen components in wastewater exist in forms of organic nitrogen and inorganic nitrogen, which are termed total nitrogen (T-N). The inorganic nitrogen is classified into ammonia nitrogen and nitrate nitrogen. The organic nitrogen and the ammonia nitrogen are termed total Kjeldahl nitrogen (TKN). Most of nitrogen in wastewater is measured as TKN. In order to biologically remove nitrogen components contained in wastewater, conversion into nitrate nitrogen (NOX) (nitrification) must be preceded. The influent nitrogen in wastewater is released to the air in the form of gaseous $N_2$ converted by denitrification after being converted into nitrate nitrogen through nitration by microorganisms. The denitrification requires presence of organic matter and requires no dissolved oxygen (DO) present in the wastewater.

In order to remove phosphorus from wastewater, a phosphorus release reaction must be accomplished by microorganisms under anaerobic conditions and then the released phosphorus are taken up by the microorganisms using oxygen or oxygen in nitrate nitrogen. Thus, phosphorus can be removed from wastewater while increasing intercellular phosphorus of microorganisms. For effectively releasing phosphorus using microorganisms, the concentration of nitrate nitrogen must be low.

As described above, the nitrification for removal of phosphorus requires abundant dissolved oxygen, while the denitrification or phosphorus release reaction requires no dissolved oxygen present. The microorganisms accomplishing denitrification or removal of phosphorus are heterotrophic bacteria requiring an organic carbon source as an energy source. Theoretically, organic matter with a COD concentration of 2.86 g is required in removing 1 g of nitrate nitrogen, and organic matter with a COD concentration of 40 g is required in removing 1 g of phosphorus.

Denitrification is largely divided into a reaction occurring in the case where organic matter is present and a reaction occurring in the case where organic matter is absent. The reaction for the latter case is called endogenous denitrification, which is performed at a low speed, requiring a longer retention time. On the other hand, in the case where organic matter is present, denitrification is performed at a very high speed, thereby reducing a retention time. Also, the denitrification rate may differ according to the kind of organic matter.

There are two types of phosphorus removing microorganisms; one is phosphorus accumulating organisms (PAO) which accomplish a bacterial metabolism using oxygen in anaerobic and aerobic tanks; and the other is denitrifying phosphorus accumulating organisms (dPAO) which accomplish a bacterial metabolism using oxygen contained in nitrate nitrogen. The use of oxygen increases oxygen demand and activates the synthesis of cells of microorganisms in the anaerobic tank, resulting in increases in repair and maintenance costs. On the other hand, the use of oxygen contained in nitrate nitrogen simultaneously causes phosphorus uptake and denitrification under anaerobic conditions, increasing nitrogen and phosphorus removal efficiency and suppressing synthesis of cells of microorganisms, thereby reducing the repair and maintenance costs.

Biological removal of nitrogen and phosphorus requires organic matter for denitrification and release of phosphorus under anaerobic conditions. In this case, costs for chemicals can be reduced by using the required organic matter from raw wastewater to be treated, compared to the case of using external carbon source. Also, the nitrogen and phosphorus removal efficiency may vary according to the concentration of organic matter contained in raw wastewater and the amount of influent wastewater.

In most conventional wastewater treatment methods, nitrogen and phosphorus have been removed using an organic carbon source contained in influent wastewater, and if necessary, phosphorus has been removed using chemicals. In order to maintain a reaction tank at a predetermined state, even the same biological removal process must employ different techniques depending on the position of return sludge. Also, most conventional wastewater treatment methods are based on the assumption that phosphorus removing microorganisms cannot accomplish denitrification.

One example of conventional wastewater treatment methods for removing nitrogen and phosphorus is disclosed in U.S. Pat. No. 4,867,883 to Daigger et al., as shown in FIG. 1.

Wastewater 10 primarily passed through a clarifier is introduced to an anaerobic tank 101 together with wastewater 12a returned from the output end of an anoxic tank 102. In the anaerobic tank 101, a phosphorus release reaction by microorganisms occurs using organic matter present in influent wastewater under the condition that there is no dissolved oxygen.

Wastewater 11 having undergone the phosphorus release reaction in the anaerobic tank 101 is introduced to the anoxic tank 102 together with return sludge 15a and wastewater 13a returned from an oxic tank 103. In the anoxic tank 102, denitrification of nitrate nitrogen present in the wastewater 13a returned from the oxic tank 103 occurs using remaining organic matter under the condition that there is no dissolved oxygen.

Wastewater 12 passed through the anoxic tank 102 is introduced to the oxic tank 103, and nitrification and luxury uptake of phosphorus occur, removing organic matter.

The wastewater passed through the oxic tank 103 is subjected to solid-liquid separation so that supernatant is discharged as treated water 14 and some of settled sludge 15a is returned to the anoxic tank 102 and the remainder 15b is wasted.

Another conventional wastewater treatment process for removing nitrogen and phosphorus is disclosed in U.S. Pat. No. 4,056,465 to Spector et al., as shown in FIG. 2.

The wastewater treatment process of Spector et al. is different from that of Daigger et al. in that return sludge 25a supplied from a clarifier 204 is introduced to an aerobic tank 201, rather than to an anoxic tank 202, and that some of wastewater 22 passed through the anoxic tank 202 is not returned to the anaerobic tank 201. Thus, in the anaerobic tank 201, a phosphorus release reaction is carried out under the condition that no nitrate nitrogen nor dissolved oxygen are present.

In both wastewater treatment processes according to Daigger et al. and Spector et al., wastewater to be treated is introduced to an anaerobic tank to cause a phosphorus release reaction by microorganisms or both a phosphorus release reaction and denitrification and then to cause denitrification in an anoxic tank. Thus, in the case where the content of organic matter is low, like in sewage, a predetermined amount of organic carbon source contained in influent wastewater is consumed up in an anaerobic tank. Thus, it is difficult for denitrification to smoothly take place in an anoxic tank that follows, which means that it is necessary to provide external carbon source. Also, efficiencies of removing nitrogen and phosphorus become different, thereby unavoidably extending the overall retention time in the reaction tank.

Also, denitrification efficiencies of the anoxic tank may be different depending on the amount of nitrate nitrogen in the wastewater returned from the output end of the oxic tank to the anoxic tank or in the return sludge. Thus, nitrogen or phosphorus in wastewater cannot be removed in a stable manner. Also, there is a limitation in removing high-concentration nitrogen and phosphorus.

Another conventional wastewater treatment process for removing nitrogen and phosphorus, which is called a Bardenpho process, is disclosed in U.S. Pat. No. 3,964,998, as shown in FIG. 3.

Primarily clarified wastewater 30 and return sludge 35a supplied from a clarifier 304 are introduced to an anaerobic tank 301. In the anaerobic tank 301, a phosphorus release reaction by microorganisms is carried out using organic matter in influent wastewater under the condition that no nitrate nitrogen nor dissolved oxygen are present.

Internally recycled wastewater 31b returned from a first aerobic tank 303a and the wastewater 31 passed through the aerobic tank 301 are introduced to a first anoxic tank 302a, and denitrification occurs in the first anoxic tank 302a using remaining organic matter under the condition that there is no dissolved oxygen.

Wastewater 32 treated by the first anoxic tank 302a is introduced to the first aerobic tank 303a, and nitrification and luxury uptake of phosphorus take place in the first aerobic tank 303a. Some of the wastewater 31b passed through the first aerobic tank 303a is introduced to the first anoxic tank 302a to be internally recycled, and the remainder 31a is introduced to a second anoxic tank 302b so that nitrogen is removed by endogenous denitrification by microorganisms.

Wastewater 32a treated by the second anoxic tank 302b is introduced to a second aerobic tank 303b and increases the deaerating action and settleability of microorganisms in a settlement site.

Wastewater 33 passed through the second aerobic tank 303b is introduced to a clarifier 304 and solid-liquid separation occurs thereat. Some of the sludge 35 settled in the clarifier 304 is returned to the anaerobic tank 301 as return sludge 35a and some is removed as waste sludge 35b.

While the wastewater treatment process of Barnard advantageously increases the efficiency of denitrification and increases sludge settleability by microorganisms by removing nitrogen based on endogenous denitrification by further providing the second anoxic tank 302b and the second aerobic tank 303b to the wastewater treatment process of Spector et al. However, further providing the second anoxic tank 302b and the second aerobic tank 303b undesirably resulted in increases in time and cost required for treatment.

Still another conventional wastewater treatment apparatus and method for removing nitrogen and phosphorus is disclosed in Korean Patent Publication No. 2001-087698, as shown in FIG. 4.

The wastewater treatment apparatus includes an anaerobic tank 401, an anoxic tank 402, an oxic tank 403 and a clarifier 404. Sludge settled in the clarifier 404 is returned to the oxic tank 403. A dissolved oxygen removal tank 403a is installed along a return line from the oxic tank 403 to the anoxic tank 402. Raw wastewater 40 to be treated is introduced into the anaerobic tank 401. The wastewater 41 passed through the anaerobic tank 401 is fed to the anoxic tank 402. The wastewater 42 passed through the anoxic tank 402 is fed to the oxic tank 403. Some wastewater 43a passed through the oxic tank 403 is returned to the anoxic tank 402 for removing nitrogen and the remainder 43 is fed to the clarifier 404. Denitrification occurs in the anoxic tank 402.

Sludge is settled in the clarifier 404, and purified water is discharged outside as treated water 44. Some sludge 45 is again fed to the oxic tank 403. Water 43a is returned from the oxic tank 403 to the anoxic tank 402 via the dissolved oxygen removal tank 403 to remove dissolved oxygen contained in the returned water, thereby increasing the processibility of the anoxic tank 402.

Although the above-described treatment process increases the denitrification efficiency of an anoxic tank by allowing treated water to be returned from an aerobic tank to the anoxic tank via a dissolved oxygen removal tank, the necessity of additionally installing the dissolved oxygen removal tank is disadvantageous from the viewpoints of cost and time.

SUMMARY OF THE INVENTION

To solve the above-described problems, it is an object of the present invention to provide a wastewater treatment apparatus and method for removing nitrogen and phosphorus, which can reduce repair and maintenance costs by installing a baffle inside an aerobic tank to improve the efficiency of removing nitrogen and phosphorus by effectively using organic matter present in wastewater, to reduce the amount of organic matter and oxygen demand and to reduce synthesized cells of microorganisms.

The present invention relates to a wastewater treatment apparatus for removing nitrogen and phosphorus, wherein a baffle is installed at one side of an aerobic tank to form a dissolved oxygen reducing zone for reducing the concentration of dissolved oxygen contained in internally recycled wastewater returned from a dissolved oxygen reducing zone while increasing the concentration of dissolved oxygen contained in treated effluent supplied from a part other than the dissolved oxygen reducing zone of the aerobic tank to a clarifier in a subsequent stage.

The wastewater treatment apparatus preferably includes a pre-anoxic tank, an anaerobic tank, a denitrifying phosphorus accumulating organism (dPAO) tank, an anoxic tank and an aerobic tank. Preferably, the respective tanks constitute a single reaction tank divided by a plurality of compartments into 5 stages.

Since raw wastewater is distributed to three lines, that is, the pre-anoxic tank, the anaerobic tank and the anoxic tank, organic matter contained in the raw wastewater is almost removed in the stage of the anoxic tank. Therefore, only nitrification occurs in the aerobic tank, thereby increasing nitrification efficiency.

Raw influent is fed by a step feed system. Return feed lines are used to return sludge from the clarifier to the pre-anoxic tank and to return sludge from the aerobic tank to the dPAO tank for internal recycle.

The distribution ratio of the step feed system is determined by characteristics of raw wastewater and treated water, so each wastewater treatment plant could have a separate distribution ratio. The step feed system is configured such that organic matter required for removing nitrogen and phosphorus is calculated both quantitatively and qualitatively to be injected into a target treatment system under optimum conditions. Also, the use of the step feed system increases 40 to 50% the quantity of microorganisms contained in each reaction tank compared to the case of conventional removal of nitrogen and phosphorus, thereby increasing safety and resistance for shock load, and reducing the retention time.

Also, according to the present invention, the use of a dPAO tank allows dPAOs to grow as genuses to simultaneously induce denitrification and uptake of phosphorus, thereby reducing the amounts of oxygen required throughout the treatment process, the amount of sludge produced and organic matter required for denitrification.

In removing phosphorus, the pre-anoxic tank is installed in front of the anaerobic tank for the purpose of suppressing inhibiting actions by nitrate nitrogen in the anaerobic tank, so that the wastewater introduced to the anaerobic tank is maintained under completely anaerobic conditions.

The purposes and functions of the respective reaction tanks will now be summarized.

| Stage | | Purposes | Functions |
|---|---|---|---|
| Pre-anoxic tank | | Denitrification for removing nitrate nitrogen in return sludge using organic matter in influent | Maintain the reaction tank under completely anaerobic conditions prior to introduction to anaerobic tank |
| Anaerobic tank | | Phosphorus release | Release phosphorus outside cells while storing organic matter in influent in the form of PHB/PHV |
| dPAO tank | | Removal of nitrogen and phosphorus | Reduce nitrate nitrogen using PHB/PHV accumulated in anaerobic tank as organic matter (electron donor) and using nitrate nitrogen returned from aerobic tank as electron acceptor |
| Anoxic tank | | Denitrification | Conduct denitrification using influent organic matter as carbon source (electron donor) and nitrate nitrogen in wastewater passed through dPAO tank as electron acceptor |
| Aerobic tank | Nitrification zone | Nitrification, oxidation of remaining organic matter and luxury uptake of phosphorus | Conduct nitrification, oxidation of organic matter and luxury uptake of phosphorus using oxygen as electron acceptor Conduct nitrification, oxidation of remaining organic matter and luxury uptake of phosphorus and suppress phosphorus release reaction from clarifier by supplying abundant oxygen to wastewater fed to clarifier |
| | Dissolved oxygen reducing zone | | Install a simplified baffle to reduce the concentration of dissolved oxygen contained in wastewater returned to dPAO tank for internal recycle |
| Clarifier | | Solid-liquid separation | Conduct solid-liquid separation of wastewater to return sludge to pre-anoxic tank, discharge supernatant and partially waste sludge |

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE INVENTION

Figure 1:
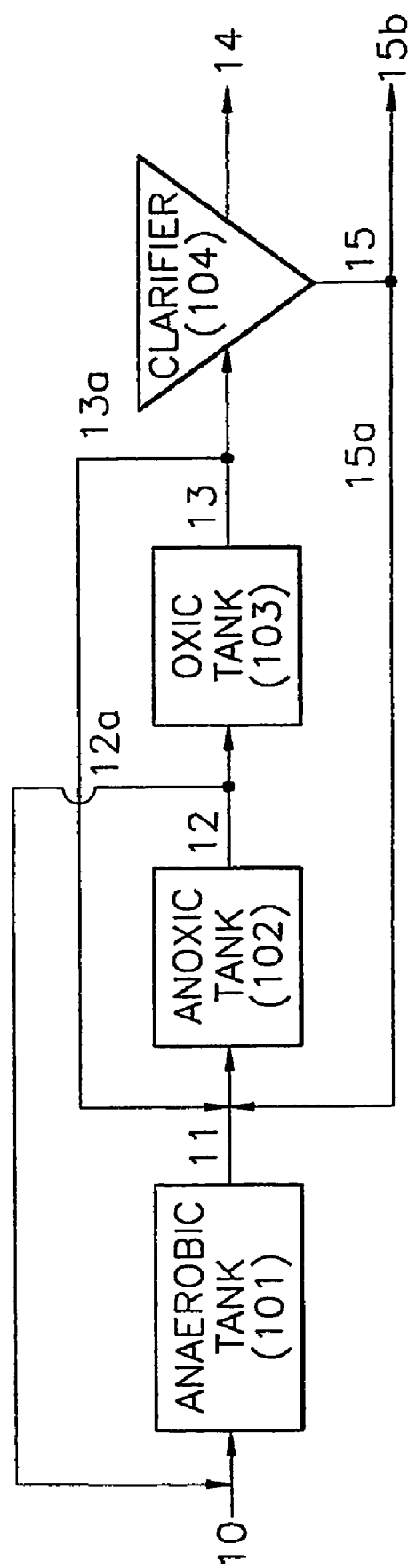
FIG. 1 is a flow diagram showing a conventional wastewater treatment method for removing nitrogen and phosphorus disclosed in U.S. Pat. No. 4,867,883 to Daigger, et al.
Figure 2:
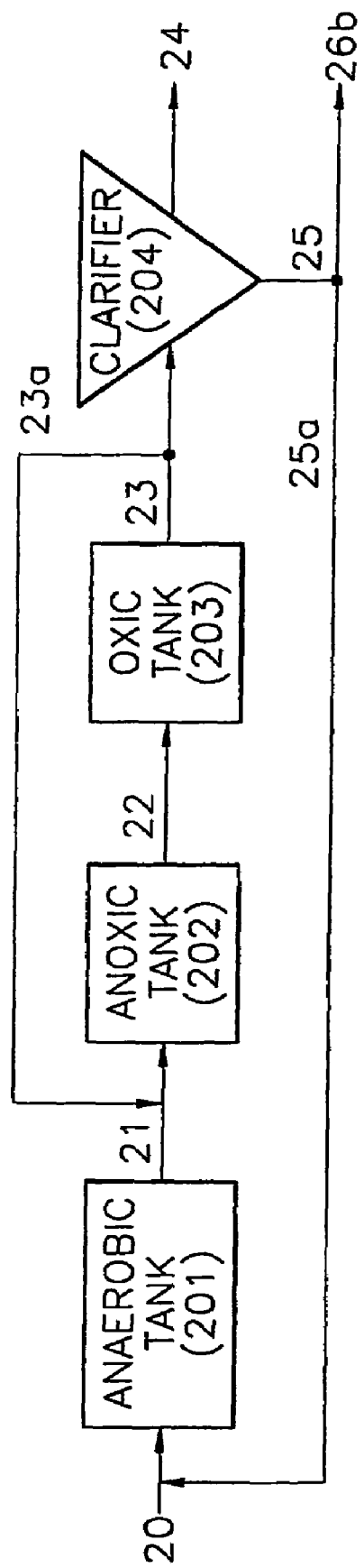
FIG. 2 is a flow diagram showing another conventional wastewater treatment method for removing nitrogen and phosphorus disclosed in U.S. Pat. No. 4,056,465 to Spector.
Figure 3:
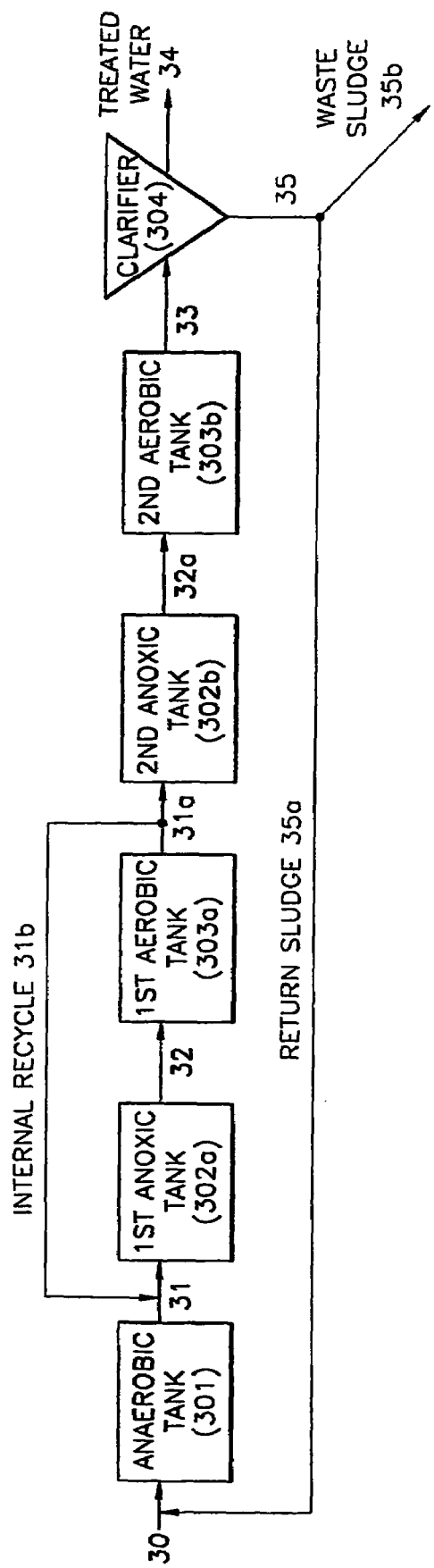
FIG. 3 is a flow diagram showing still another conventional wastewater treatment method for removing nitrogen and phosphorus disclosed in U.S. Pat. No. 3,964,998 to Barnard.
Figure 4:
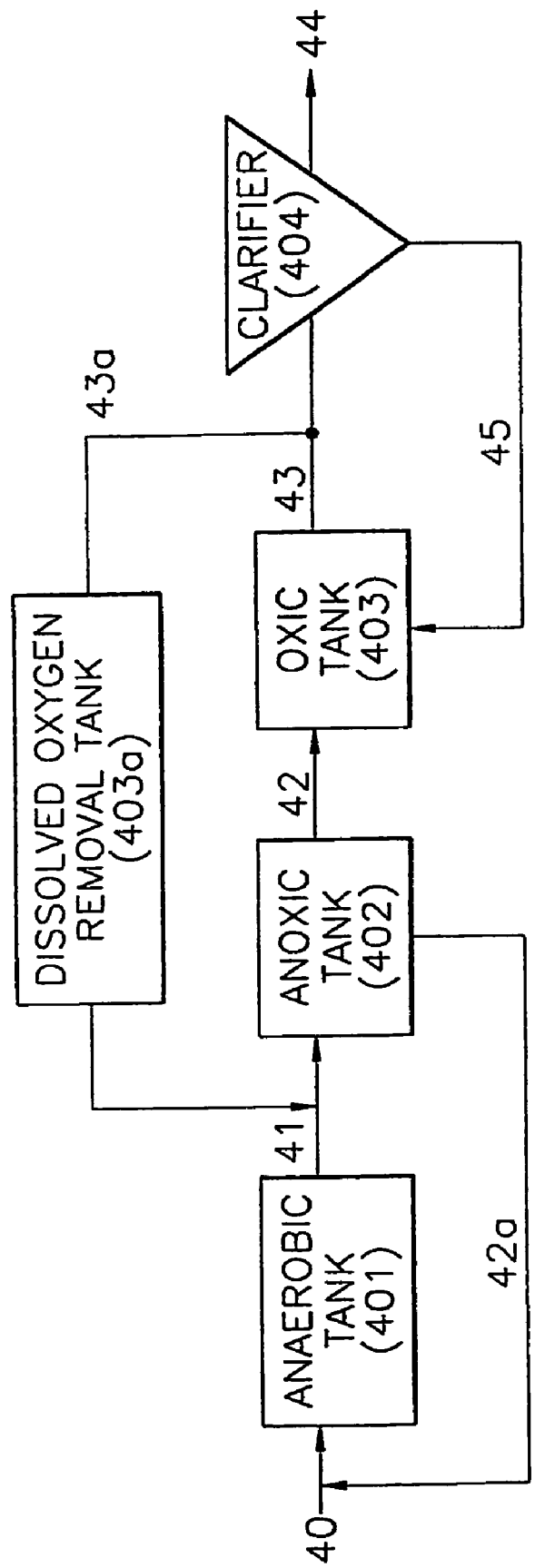
FIG. 4 is a flow diagram showing still another conventional wastewater treatment method for removing nitrogen and phosphorus disclosed in Korean Patent Publication No. 2001-087698.

A wastewater treatment apparatus and method for removing nitrogen and phosphorus will now be described in more detail with reference to the accompanying drawings.

First, the present invention provides a wastewater treatment apparatus for removing nitrogen and phosphorus, wherein a baffle is installed at one side of an aerobic tank to form a dissolved oxygen reducing zone for reducing the concentration of dissolved oxygen contained in internally recycled wastewater returned from a dissolved oxygen reducing zone while increasing the concentration of dissolved oxygen contained in treated effluent supplied from a part other than the dissolved oxygen reducing zone of the aerobic tank to a clarifier in a subsequent stage.

The wastewater treatment apparatus includes a pre-anoxic tank to which sludge returned from the clarifier and some of raw wastewater are introduced, an anaerobic tank to which the wastewater treated by the pre-anoxic tank and some of raw wastewater are introduced and in which a phosphorus release reaction by microorganisms occurs under anaerobic conditions, a denitrifying phosphorus accumulating organism (dPAO) tank to which the wastewater treated by the anaerobic tank and the wastewater treated by a dissolved oxygen reducing zone of the aerobic tank are introduced and in which denitrification and removal of phosphorus occur at the same time by dPAOs, an anoxic tank to which the wastewater treated by the dPAO tank and some of raw wastewater are introduced and in which denitrification of nitrate nitrogen occurs under anoxic conditions, and an aerobic tank to which the wastewater treated by the anoxic tank is introduced and in which nitrification and luxury uptake of phosphorus occur with supply of oxygen.

The wastewater treatment apparatus may further include a clarifier for settling solid components in the wastewater treated by the aerobic tank.

Also, the raw wastewater is introduced to the pre-anoxic tank, the anaerobic tank and the anoxic tank. In the wastewater treatment apparatus, the sizes of the respective reaction tanks can be adjusted according to the quality of influent and effluent. Raw influent is fed by a step feed system.

Return feed lines are used to return sludge from the clarifier to the pre-anoxic tank and to return sludge from the aerobic tank to the dPAO tank for internal recycle.

The distribution ratio of the step feed system is determined by characteristics of raw wastewater and treated water and systematic characteristics of wastewater treatment plants. The step feed system is configured such that organic matter required for removing nitrogen and phosphorus is calculated both quantitatively and qualitatively to be injected into a target treatment system under optimum conditions. Also, the use of the step feed system increases 40 to 50% the quantity of microorganisms contained in each reaction tank compared to the case of conventional removal of nitrogen and phosphorus, thereby increasing resistance of shock load and safety, and reducing the retention time.

The pre-anoxic tank, the anaerobic tank, the dPAO tank, the anoxic tank and the aerobic tank are installed in a reaction tank divided by a plurality of compartments.

Alternatively, the present invention also provides a wastewater treatment method using the apparatus, the method including supplying raw wastewater to a pre-anoxic tank, an anaerobic tank and an anoxic tank, denitrifying nitrate nitrogen using organic matter contained in the raw influent of the pre-anoxic tank, conducting a phosphorus release reaction by microorganisms using the treated wastewater fed to the anaerobic tank after passing through the pre-anoxic tank and the raw wastewater fed to the anaerobic tank, introducing the wastewater treated by the anaerobic tank to the dPAO tank to conduct denitrification and removal of phosphorus at the same time by dPAOs, conducting denitrification of nitrate nitrogen using the treated wastewater fed to the anoxic tank after passing through the dPAO tank and the raw wastewater fed to the anoxic tank, introducing the wastewater treated by the anoxic tank to an oxic tank to conduct nitrification of ammonia nitrogen and luxury uptake of phosphorus at the same time, and reducing the content of dissolved oxygen contained in the treated wastewater from a dissolved oxygen reducing zone of a baffle installed in the aerobic tank to return the wastewater to the dPAO tank and increasing the content of dissolved oxygen contained in the treated effluent introduced to the aerobic tank in a subsequent stage to be discharged to the clarifier.

A wastewater treatment apparatus according to a preferred embodiment of the present invention will now be described in more detail with reference to the accompanying drawings.

Figure 5:
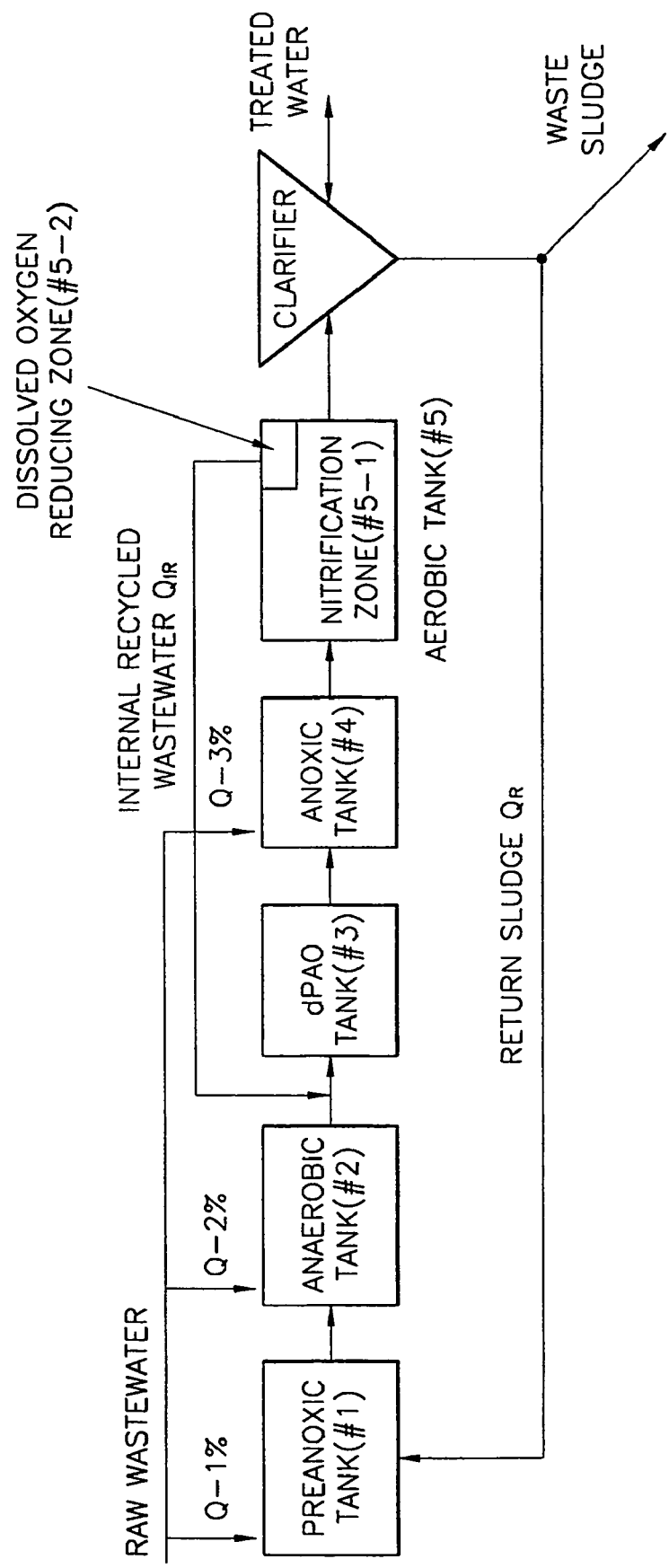
FIG. 5 is a schematic diagram of a wastewater treatment apparatus according to the present invention.

As shown in FIG. 5, the wastewater treatment apparatus according to a preferred embodiment of the present invention includes a pre-anoxic tank (#1), an anaerobic tank (#2), a dPAO tank (#3), an anoxic tank (#4), an aerobic tank (#5) and a clarifier (#6). The purposes and functions of the respective reaction tanks will now be described.

(1) Pre-Anoxic Tank (#1)

Influent wastewater introduced to a pre-anoxic tank #1 includes sludge $Q_R$ returned from a clarifier and raw wastewater $Q_{-1}$. In other words, the purpose of installing the pre-anoxic tank #1 is to accomplish denitrification of nitrate nitrogen contained in the return sludge $Q_R$ using organic matter contained in raw wastewater $Q_{-1}$ by supplying some of the raw wastewater $Q_{-1}$ and to prevent a secondary phosphorus release reaction. The supply of raw wastewater $Q_{-1}$ increases a denitrification rate, thereby reducing a hydraulic retention time (HRT). In general, even though there is no supply of raw wastewater, the denitrification rate is relatively high in summer due to high atmospheric temperature. In winter, on the other hand, only an endogenous reaction without supply of raw wastewater results in an increase in HRT due to low atmospheric temperature, which may cause a secondary phosphorus release reaction. Thus, it is advantageous to supply raw wastewater in winter.

In the pre-anoxic tank #1, a phosphorus release reaction is prevented from taking place by supplying raw wastewater $Q_{-1}$, and nitrate nitrogen supplied to an anaerobic tank is removed to avoid a phosphorus release inhibiting action in the anaerobic tank. The pre-anoxic tank #1 requires sludge mixing and no supply of oxygen.

(2) Anaerobic Tank (#2)

Influent wastewater introduced to an aerobic tank #2 includes raw wastewater $Q_{-2}$ and wastewater passed through the pre-anoxic tank #1. In the anaerobic tank #2, a phosphorus release reaction occurs under the condition that there is no dissolved oxygen. During the phosphorus release reaction, the organic matter in influent is stored in the forms of intracellular poly-β-hydroxybutyrate (PHB) and poly-β-hydroxyvalate (PHV) using the energy generated by conversion of adenosine triphosphate (ATP) contained in microorganism cells into adenosine diphosphate (ADP). In the case where nitrate nitrogen-is present in influent, it is difficult to accomplish a phosphorus release reaction because the nitrate nitrogen is used as an electron acceptor. If no phosphorus release reaction occurs, there is no luxury uptake of phosphorus so that biological removal of phosphorus cannot be achieved. The anaerobic tank #2 requires sludge mixing and no supply of oxygen.

(3) dPAO Tank (#3)

Influent wastewater introduced to a dPAO tank #3 includes treated wastewater passed through the anaerobic tank #2 and wastewater $Q_{IR}$ internally recycled in a dissolved oxygen reducing zone #5-2 of an aerobic tank #5. In the dPAO tank #3, denitrification by the organic matter stored in the anaerobic tank #2 in the forms of PHB/PHV occurs by dPAO using oxygen of nitrate nitrogen contained in the internally recycled wastewater $Q_{IR}$. At this time, phosphorus is also removed by luxury uptake thereof. Thus, denitrification and uptake of phosphorus take place at the same time, and the organic matter necessary for denitrification can be saved. In general processes for removing nitrogen and phosphorus, intracellular PHB/PHV stored during a phosphorus release reaction taking place in the anaerobic tank #2 are oxidized in an aerobic tank in a subsequent stage using oxygen as an electron acceptor for luxury uptake of phosphorus. That is, the intracellular PHB/PHV consume oxygen in the later-stage aerobic tank. On the other hand, in the dPAO tank #3, some of PHB/PHV are oxidized in the course of bacterial metabolism, thereby reducing oxygen consumed by the anaerobic tank #2. Also, oxidizing PHB/PHV in the dPAO tank #3 using nitrate nitrogen as an electron acceptor reduces the quantity of synthesized cells compared to the case in which oxygen is used as an electron acceptor, thereby reducing the amount of sludge generated. Further, since organic matter is available from the intracellular PHB/PHV stored during a phosphorus release reaction taking place in the anaerobic tank #2, the organic matter necessary for denitrification can be advantageously reduced.

In the dPAO tank #3, denitrification and removal of phosphorus take place at the same time. The dPAO tank #3 requires sludge mixing and no supply of oxygen.

(4) Anoxic Tank (#4)

The wastewater passed through the dPAO tank #3 and some of raw wastewater $Q_3$ are introduced to an anoxic tank #4. In the anoxic tank #4, denitrification of nitrate nitrogen present in the wastewater passed through the dPAO tank #3 occurs using organic matter contained in raw wastewater. If there is nitrate nitrogen remaining after removal of influent organic matter, the remaining nitrogen can be removed by endogenous denitrification. Eventually, the HRT is determined by the concentration of nitrate nitrogen and the amount of organic matter. The anoxic tank #4 requires sludge mixing and no supply of oxygen.

(5) Aerobic Tank (#5)

A baffle is installed at one side of an aerobic tank #5 to form a nitrification zone and a dissolved oxygen reducing zone for the purpose of preventing phosphorus from being released under anoxic/anaerobic conditions by maintaining dissolved oxygen in influent wastewater introduced to a clarifier and for the purpose of increasing denitrification efficiency in the anoxic tank #4 by reducing the content of dissolved oxygen contained in internally recycled water returned from the dissolved oxygen reducing zone to the dPAO tank #3. The baffle is fixed to two surfaces of the aerobic tank #5 to divide the upper portion of the aerobic tank #5 into two parts with the lower portion of the aerobic tank #5 being opened. An aerator is installed at the nitrification zone and no aerator is installed at the dissolved oxygen reducing zone. Treated wastewater is introduced from the nitrification zone being at an aerated state to a clarifier, and the treated wastewater is internally recycled at the dissolved oxygen reducing zone inside the baffle. No additional aerators are separately installed at the lower portion of the dissolved oxygen reducing zone and the baffle may be simply installed, if necessary. Thus, the functional effects exerted by the baffle can be maximized at minimum installation cost.

Figure 6:
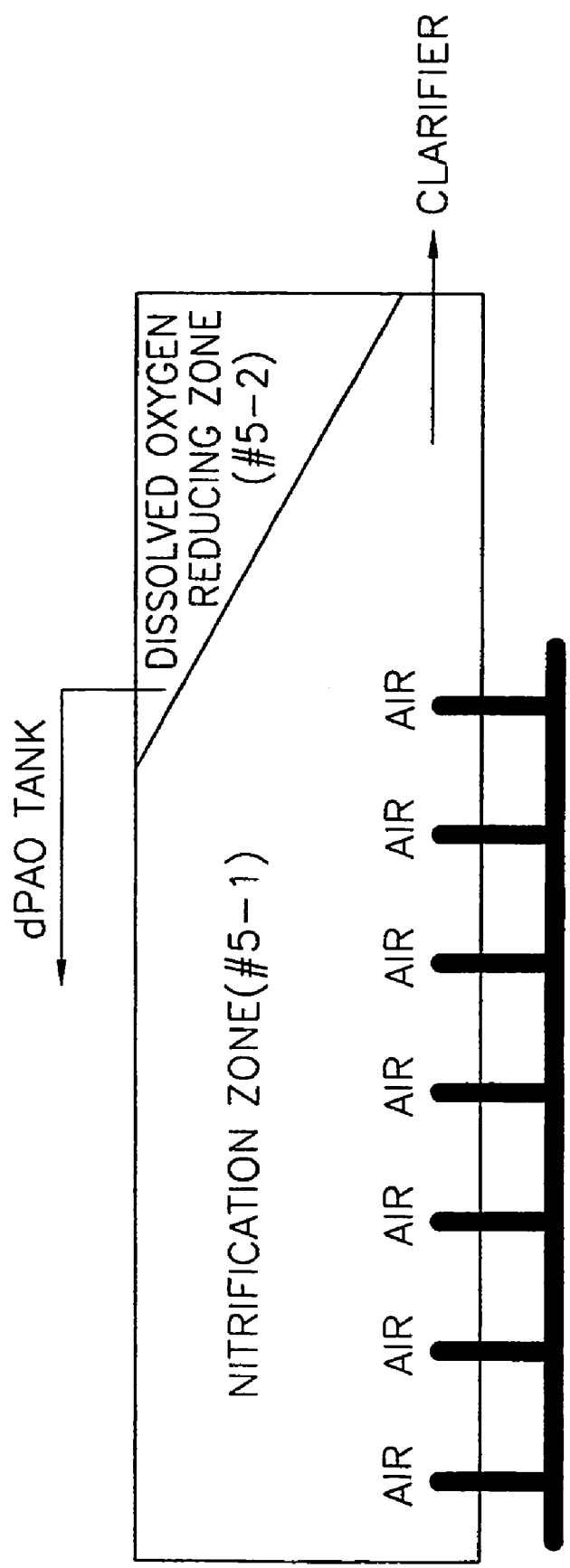
FIG. 6 is a schematic diagram of an aerobic tank having a dissolved oxygen reducing zone.

A preferred example of an aerobic tank according to the present invention is schematically shown in FIG. 6.

a. Nitrification Zone (#5-1)

The wastewater passed through the anoxic tank #4 is introduced to the nitrification zone #5-1. Ammonia nitrogen is abundant in the influent wastewater and is converted into nitrate nitrogen in the aerobic tank #5. Some of the phosphorus released from the anaerobic tank #2 is removed by the dPAO tank #3 and unremoved phosphorus is removed by luxury uptake of phosphorus in the aerobic tank #5 using oxygen as a final electron acceptor. Since influent without little organic matter is introduced to the aerobic tank #5, the nitrification efficiency of the aerobic tank #5 is relatively higher than the other process for removing nitrogen and phosphorus, thereby reducing HRT. Supply of oxygen is required for nitrification and luxury uptake of phosphorus.

b. Dissolved Oxygen Reducing Zone (#5-2)

A simplified baffle having a third (⅓) the retention time in the aerobic tank #5 is installed and a dissolved oxygen reducing zone is formed such that the upper half portion thereof is isolated from the nitrification zone #5-1, the lower half portion thereof is connected to the nitrification zone #5-1, and no air is supplied to the bottom portion thereof because there is no aerator installed at the bottom of the dissolved oxygen reducing zone, thereby reducing the concentration of dissolved oxygen by microorganisms. Therefore, the denitrification efficiency can be increased by reducing the concentration of dissolved oxygen contained in internally recycled wastewater returned to the dPAO tank #3.

(6) Clarifier (#6)

The wastewater passed through the aerobic tank #5 is introduced to a clarifier #6 to return the sludge settled by solid-liquid separation to the pre-anoxic tank #1.

The present invention will now be described in more detail with reference to Examples, but it should be understood that the illustrated examples are not considered limiting as to the scope of the invention.

EXAMPLES

The following examples of the present invention are based on various experiments conducted on a pilot equipment with the reaction tank as shown in FIG. 5 installed in a wastewater treatment plant operated over a period from November 1997 to Nov. 29, 2001. The pilot equipment was operated with a treatment capacity of 40 L/d or 50 m³/d. The pilot plant is subdivided by a plurality of compartments into 5 stages and the capacities of the respective reaction tanks were set to 1 m³, 2.1 m³, 1 m³, 4.2 m³ and 7.3 m³, respectively. Sludge was returned from the clarifier to the pre-anoxic tank #1.

Examples 1 through 24 illustrate wastewater treatment performed with a baffle installed in an aerobic tank, while Comparative Examples 1 through 24 illustrate wastewater treatment performed without a baffle installed in an aerobic tank.

Example 1

Each 50% by volume of influent wastewater was introduced to the anaerobic tank #2 and the anoxic tank #4. HRT of each of the pre-anoxic tank #1, the anaerobic tank #2 and the anoxic tank #4 was set to 30 minutes. 100% by volume of internally recycled wastewater $Q_{IR}$ internally returned from the aerobic tank #5 to the dPAO tank #3, was subjected to wastewater treatment.

Example 2

Except that 10%, 50% and 40% by volume of influent wastewater were introduced to the pre-anoxic tank #1, the anaerobic tank #2 and the anoxic tank #4, respectively, wastewater treatment was conducted in the same manner as in Example 1.

Example 3

Except that 10%, 60% and 30% by volume of influent wastewater were introduced to the pre-anoxic tank #1, the anaerobic tank #2 and the anoxic tank #4, respectively, wastewater treatment was conducted in the same manner as in Example 1.

Examples 4–6

Except that 150% by volume of internally recycled wastewater $Q_{IR}$ returned from the aerobic tank #5 to the dPAO tank #3, was used for internal recycle, wastewater treatment was conducted in the same manners as in Examples 1, 2 and 3, respectively.

Examples 7–9

Except that 200% by volume of internally recycled wastewater $Q_{IR}$ returned from the aerobic tank #5 to the dPAO tank #3, was used for internal recycle, wastewater treatment was conducted in the same manners as in Examples 1, 2 and 3, respectively.

Examples 10–12

Except that 300% by volume of internally recycled wastewater $Q_{IR}$ returned from the aerobic tank #5 to the dPAO tank #3, was used for internal recycle, wastewater treatment was conducted in the same manners as in Examples 1, 2 and 3, respectively.

Examples 13–24

Except that HRT of each of the pre-anoxic tank #1, the anaerobic tank #2 and the dPAO tank #3 was set to 60 minutes, wastewater treatment was conducted in the same manners as in Examples 1 through 12, respectively.

Comparative Examples 1–24

Wastewater treatment were conducted in the same manner as in Examples 1 through 5, with the exception of a baffle not being installed in the aerobic tank #5.

Test Examples

Biological oxygen demand (BOD), suspended solid (SS), nitrogen and phosphorus concentrations of raw influent and treated effluent were measured for the cases of Examples 1–24, Comparative Examples 1–24 and A²/O process.

The concentration of total nitrogen (T-N), which is the sum of TKN and NOX, was measured using a Nessler reagent. The concentration of ortho-P was measured by a highly-performance liquid chromatography (HPLC).

The concentration of BOD was measured using the content of dissolved oxygen using a BOD incubator by a Winkler method for Azide modification (Standard Methods, 5210).

The concentration of SS was measured using a dry oven maintained at a temperature of 103 to 105° C. and a muffle furnace, which is an indirect heating chamber, maintained at approximately 550° C. by a gravimetric analysis (Standard Methods, 2540). The results of the experiments are shown in Table 2.

TABLE 2

Comparison of biological removal of nitrogen and phosphorus according to the present invention with A²/O process

|  | Influent | Comparative Examples 1–24 | Examples 1–24 | A²/O process |
| --- | --- | --- | --- | --- |
| BOD | 140–210 (187) | 5–15 (11) | 3–6 (5) | 6–13 (10) |
| SS | 130–250 (120) | 6–18 (13) | 3–8 (5) | 7–13 (10) |
| Nitrogen | 25–59 (42) | 7–13 (11) | 3–8 (5) | 8–18 (13) |
| Phosphorus | 4.2–10 (5.8) | 0.5–12 (0.8) | 0.1–0.5 (0.2) | 1.2–3.0 (2.2) |
| HRT (Hour) |  | 7.5 | 7.5 | 9–11 |

(* Values in parentheses are averages.)

According to the present invention, the retention time in the reaction tank can be reduced, thereby reducing the construction cost of a wastewater treatment equipment. Also, the quality of treated effluent is relatively good compared to the conventional wastewater treatment process. Further, the wastewater treatment according to the present invention can be accomplished in a stable manner.

What is claimed is:

1. A wastewater treatment apparatus for removing nitrogen and phosphorus having a pre-anoxic tank, an anaerobic tank, a denitrifying phosphorus accumulating organism (dPAO) tank, an anoxic tank, an aerobic tank, and a clarifier wherein:

(a) sludge returned from the clarifier and some of the wastewater are introduced into the pre-anoxic tank, (b) wastewater treated by the pre-anoxic tank and some of the raw wastewater are introduced into the anaerobic tank in which a phosphorous release reaction by microorganisms occurs under anaerobic conditions, (c) wastewater treated by the denitrifying phosphorous accumulating organism (dPAO) tank and some raw wastewater are introduced into the anoxic tank in which denitrification of nitrate nitrogen occurs under anoxic conditions, (d) wastewater treated by the anoxic tank is introduced into the aerobic tank in which nitrification and luxury uptake of phosphorous occur with supply of oxygen, (e) the aerobic tank includes a baffle installed at one side thereof to form a dissolved oxygen reducing zone for reducing the concentration of dissolved oxygen contained in internally recycled wastewater returned from a dissolved oxygen reducing zone while increasing the concentration of dissolved oxygen contained in treated effluent supplied from a part other than the dissolved oxygen reducing zone of the aerobic tank to a clarifier in a subsequent stage, and (f) wastewater treated by the anaerobic tank and the wastewater treated by the dissolved oxygen reducing zone of the aerobic tank are introduced into the denitrifying phosphorous accumulating organism (dPAO) tank in which denitrification and removal of phosphorous occur at the same time by denitrifying accumulating organisms (dPAOs).

2. The wastewater treatment apparatus according to claim 1, wherein the clarifier settles solid components in the wastewater treated by the aerobic tank.

3. A wastewater treatment method using the apparatus according to claim 2, comprising:
supplying raw wastewater to a pre-anoxic tank, an anaerobic tank and an anoxic tank;
denitrifying nitrate nitrogen using organic matter contained in the raw influent of the pre-anoxic tank;
conducting a phosphorus release reaction by microorganisms using the treated wastewater fed to the anaerobic tank after passing through the pre-anoxic tank and the raw wastewater fed to the anaerobic tank;
introducing the wastewater treated by the anaerobic tank to the dPAO tank to conduct denitrification and removal of phosphorus at the same time by dPAOs;
conducting denitrification of nitrate nitrogen using the treated wastewater fed to the anoxic tank after passing through the dPAO tank and the raw wastewater fed to the anoxic tank;
introducing the wastewater treated by the anoxic tank to an aerobic tank to conduct nitrification of ammonia nitrogen and luxury uptake of phosphorus at the same time; and
reducing the content of dissolved oxygen contained in the treated wastewater from a dissolved oxygen reducing zone of a baffle installed in the aerobic tank to return the wastewater to the dPAO tank and increasing the content of dissolved oxygen contained in the treated effluent supplied from a part other than the dissolved oxygen reducing zone of the aerobic tank to a clarifier in a subsequent stage.

4. The wastewater treatment apparatus according to claim 1 wherein the pre-anoxic tank, the anaerobic tank, the dPAO tank, the anoxic tank and the aerobic tank are installed in a reaction tank divided by a plurality of compartments.

5. A wastewater treatment method using the apparatus according to claim 4, comprising:
supplying raw wastewater to a pre-anoxic tank, an anaerobic tank and an anoxic tank;
denitrifying nitrate nitrogen using organic matter contained in the raw influent of the pre-anoxic tank;
conducting a phosphorus release reaction by microorganisms using the treated wastewater fed to the anaerobic tank after passing through the pre-anoxic tank and the raw wastewater fed to the anaerobic tank;
introducing the wastewater treated by the anaerobic tank to the dPAO tank to conduct denitrification and removal of phosphorus at the same time by dPAOs;
conducting denitrification of nitrate nitrogen using the treated wastewater fed to the anoxic tank after passing through the dPAO tank and the raw wastewater fed to the anoxic tank;
introducing the wastewater treated by the anoxic tank to an aerobic tank to conduct nitrification of ammonia nitrogen and luxury uptake of phosphorus at the same time; and
reducing the content of dissolved oxygen contained in the treated wastewater from a dissolved oxygen reducing zone of a baffle installed in the aerobic tank to return the wastewater to the dPAO tank and increasing the content of dissolved oxygen contained in the treated effluent supplied from a part other than the dissolved oxygen reducing zone of the aerobic tank to a clarifier in a subsequent stage.

6. A wastewater treatment method using the apparatus according to claim 1, comprising:
supplying raw wastewater to a pre-anoxic tank, an anaerobic tank and an anoxic tank;
denitrifying nitrate nitrogen using organic matter contained in the raw influent of the pre-anoxic tank;
conducting a phosphorus release reaction by microorganisms using the treated wastewater fed to the anaerobic tank after passing through the pre-anoxic tank and the raw wastewater fed to the anaerobic tank;
introducing the wastewater treated by the anaerobic tank to an dPAO tank to conduct denitrification and removal of phosphorus at the same time by dPAOs;
conducting denitrification of nitrate nitrogen using the treated wastewater fed to the anoxic tank after passing through the dPAO tank and the raw wastewater fed to the anoxic tank;
introducing the wastewater treated by the anoxic tank to an aerobic tank to conduct nitrification of ammonia nitrogen and luxury uptake of phosphorus at the same time; and
reducing the content of dissolved oxygen contained in the treated wastewater from a dissolved oxygen reducing zone of a baffle installed in the aerobic tank to return the wastewater to the dPAO tank and increasing the content of dissolved oxygen contained in the treated effluent supplied from a part other than the dissolved oxygen reducing zone of the aerobic tank to a clarifier in a subsequent stage.

7. The wastewater treatment method according to claim 6, further comprising introducing the wastewater treated by the aerobic tank to the clarifier, settling solid components and returning some of the settled sludge to the pre-anoxic tank.

8. The wastewater treatment apparatus according to claim 1, wherein the raw influent is introduced by a step feed system.

9. A wastewater treatment method using the apparatus according to claim 8, comprising:
supplying raw wastewater to a pre-anoxic tank, an anaerobic tank and an anoxic tank;

denitrifying nitrate nitrogen using organic matter contained in the raw influent of the pre-anoxic tank;

conducting a phosphorus release reaction by microorganisms using the treated wastewater fed to the anaerobic tank after passing through the pre-anoxic tank and the raw wastewater fed to the anaerobic tank;

introducing the wastewater treated by the anaerobic tank to the dPAO tank to conduct denitrification and removal of phosphorus at the same time by dPAOs;

conducting denitrification of nitrate nitrogen using the treated wastewater fed to the anoxic tank after passing through the dPAO tank and the raw wastewater fed to the anoxic tank;

introducing the wastewater treated by the anoxic tank to an aerobic tank to conduct nitrification of ammonia nitrogen and luxury uptake of phosphorus at the same time; and reducing the content of dissolved oxygen contained in the treated wastewater from a dissolved oxygen reducing zone of a baffle installed in the aerobic tank to return the wastewater to the dPAO tank and increasing the content of dissolved oxygen contained in the treated effluent supplied from a part other than the dissolved oxygen reducing zone of the aerobic tank to a clarifier in a subsequent stage.

* * * * *

UNITED STATES PATENT AND TRADEMARK OFFICE
CERTIFICATE OF CORRECTION

| | |
|---|---|
| PATENT NO. | : 7,195,712 B2 |
| APPLICATION NO. | : 10/505424 |
| DATED | : March 27, 2007 |
| INVENTOR(S) | : Jong-Bok Park et al. |

It is certified that error appears in the above-identified patent and that said Letters Patent is hereby corrected as shown below:

On the title page item [73], insert --Samsung Engineering Co., Ltd.-- Delete "Samsung Electronics Co., Ltd."

Signed and Sealed this

Fourth Day of December, 2007

JON W. DUDAS
*Director of the United States Patent and Trademark Office*